(12) United States Patent
Algüera et al.

(10) Patent No.: US 7,036,847 B2
(45) Date of Patent: May 2, 2006

(54) ARRANGEMENT OF A MOTOR ON A SUPPORT WINCH

(75) Inventors: Jose Algüera, Aschaffenburg (DE); Martin Richter, Frankfurt am Main (DE); Michael Eiermann, Pfungstadt (DE)

(73) Assignee: Jost-Werke GmbH & Co. KG, (DE)

( * ) Notice: Subject to any disclaimer, the term of this patent is extended or adjusted under 35 U.S.C. 154(b) by 0 days.

(21) Appl. No.: 10/655,320

(22) Filed: Sep. 4, 2003

(65) Prior Publication Data

US 2004/0075262 A1   Apr. 22, 2004

(30) Foreign Application Priority Data

Sep. 6, 2002   (DE) ................ 102 41 905

(51) Int. Cl.
*B60S 9/00*   (2006.01)
(52) U.S. Cl. ................ 280/763.1; 280/765.1
(58) Field of Classification Search .......... 280/475, 280/427–429, 431, 763.1, 764.1, 765.1, 766.1
See application file for complete search history.

(56) References Cited

U.S. PATENT DOCUMENTS

| | | | | |
|---|---|---|---|---|
| 3,182,956 A | * | 5/1965 | Dalton ................ | 254/419 |
| 3,784,160 A | * | 1/1974 | Phillips ............... | 254/425 |
| 4,129,322 A | * | 12/1978 | Kuntz, Jr. ............ | 254/419 |
| 4,466,637 A | * | 8/1984 | Nelson ............... | 280/766.1 |
| 5,050,845 A | * | 9/1991 | Aline et al. .......... | 254/419 |
| 5,451,076 A | * | 9/1995 | Burkhead ............ | 280/766.1 |
| 2001/0054815 A1 | * | 12/2001 | Baird et al. ......... | 280/766.1 |

FOREIGN PATENT DOCUMENTS

EP   0 179 632   4/1986

* cited by examiner

*Primary Examiner*—Lesley D. Morris
*Assistant Examiner*—L. Lum
(74) *Attorney, Agent, or Firm*—Hudak, Shunk & Farine Co. LPA

(57) ABSTRACT

An arrangement of a motor on twin landing gears is described. The landing gears are interconnected via a connecting shaft and can be telescoped by starting up the motor. To minimize damage to the motor and at the same time to ensure cost-effective production, it is provided that the motor with its driveshaft engages with the connecting shaft and is supported on a component that is fixed relative to the motor.

18 Claims, 4 Drawing Sheets

ARRANGEMENT OF A MOTOR ON A SUPPORT WINCH

FIELD OF THE INVENTION

The invention relates to an arrangement of a motor on twin landing gears, particularly on a semi-trailer of a tractor-trailer, such that the landing gears are interconnected via a connecting shaft and can be telescoped by starting up the motor.

BACKGROUND OF THE INVENTION

After coupling or uncoupling the semi-trailer, the landing gears are telescoped, i.e. they are extended or retracted, and support the standing semi-trailer. This extending and retracting of the landing gears is usually done by the driver using a hand crank that is mounted on one of the landing gears. To relieve the driver of this physically strenuous work, efforts are being made to apply the power required to retract and extend the landing gears by a motor.

Such an arrangement of a motor on a landing gear is disclosed in EP 0 179 632. The motor is mounted to one of the landing gears from the outside—in place of the hand crank—to a primary shaft of the landing gear gearbox. The essential drawback of the power-driven landing gear of the prior art is that the motor is mounted on the outside of the landing gear in an unprotected area and, in practice, is frequently damaged. A further drawback is that the motor must be designed for a low speed and a high speed of the landing gear, which entails substantial motor design complexity because it requires either a motor control or an additional motor speed.

SUMMARY OF THE INVENTION

Thus, the object of the invention is to provide an arrangement of a motor that minimizes damage to the motor and at the same time can be produced cost-effectively.

According to the invention, this object is attained by an arrangement in which the motor with its driveshaft engages with the connecting shaft and is supported on a component that is fixed relative to the motor.

By supporting the motor on a fixed component, co-rotation of the motor is effectively prevented and, as a result, a rotation of the connecting shaft is realized.

By positioning the motor on the connecting shaft, the problem of adjusting the motor to the typically two-speed gearbox of the landing gear is solved by arranging the motor behind the gearbox in the line of force. As a result it is possible, in turn, to use commercially available, simply constructed motors.

A further advantage of the arrangement according to the invention is that the motor is mounted in a protected area between the landing gears, in the case of semi-trailers underneath the semi-trailer floor and thus cannot be easily damaged during travel.

Furthermore, the landing gears do not need to be modified for retrofitting, or the manufacturer can use the same components for different landing gear types.

In a special embodiment, a spring element is arranged between the motor and the fixed component.

The spring element prevents damage to the motor when the landing gear drives against its upper or lower limit stop as the motor is still coasting due to its centrifugal mass. The elasticity of the spring element protects the motor against an abrupt load, especially when driving against the upper hard limit stop, but also when starting up the motor. This extends the life of the motor and also allows the use of less expensive motors.

The spring element preferably is a spiral spring, particularly a coil spring, a torsion element or a shock absorber. The spiral spring can be installed in its axial extension or can be used as a torsion element. The term shock absorber should be understood as including spring buffers.

A torsion element may also be an elastic hose or an elastic tube.

The fixed component is advantageously at least one of the two landing gears and in this case especially preferably the rear side of the landing gear mounting plate by means of which the landing gear is screwed to the semi-trailer.

The spiral spring or the torsion element is advantageously non-rotatably mounted to at least one of the landing gears and to the motor, such that when the landing gear is driven against a limit stop, the entire motor is gently supported in its direction of rotation.

The spiral spring or the torsion element preferably surrounds the connecting shaft at least partially.

It has proven to be particularly advantageous if the connecting shaft is arranged contactless within the spiral spring or the torsion element. This prevents friction losses between the connecting shaft and the spiral spring or the torsion element as the landing gear is telescoped.

In an alternative embodiment, the fixed component is the underside of the semi-trailer floor. In this case, the spiral spring or the shock absorber can be arranged between the motor and the underside of the semi-trailer floor.

It has proven to be advantageous if the spiral spring has an upper and a lower partial spring arranged on a guide tube, and the outer ends of these partial springs can be fixed by an end stop. Between the upper and the lower partial spring, a mounting bushing is arranged on the guide tube. Preferably, the mounting bushing or the shock absorber is connected with the motor at a stop point. This stop point may allow the motor to pivot relative to the mounting bushing. When the landing gear is extended, the motor, due to its startup torque, could, for example, compress the upper partial spring via the mounting bushing, so that an abrupt loading of the motor and the components in the line of force downstream thereof is avoided. When the landing gear is extended completely, the foot of the landing gear touches the ground, i.e. the landing gear has reached its lower limit stop. The motor, however, continues to rotate for a brief time because of its centrifugal mass, so that the mounting bushing again presses against the upper partial spring and an abrupt loading is consequently avoided. Since the motor changes its direction of rotation when the landing gear is retracted, the lower partial spring is compressed both during startup and when driving against the upper limit stop.

Advantageously, the guide tube is placed onto an inner tube and can be connected with the inner tube in different positions in axial direction. This makes it possible to adjust and adapt the guide tube to the spatial conditions of the specific application to ensure optimized cooperation of the mounting bushing clamped by the partial springs and the motor fixed at the stop point.

In the above-described embodiments, the connecting shaft can be non-rotatably mounted on the driveshaft. This makes it possible to realize a loss-free and maintenance-free power transmission.

In a further advantageous embodiment, a spring element is arranged between the driveshaft and the connecting shaft. In contrast to the above-described embodiments, an elastic element is introduced directly in the line of force between the driveshaft of the motor and the connecting shaft.

The spring element can be an elastic sleeve, a belt drive or a slip coupling. The elastic sleeve is made of an elastic material, e.g. rubber.

The elastic sleeve is advantageously configured as an air chamber sleeve. This air chamber sleeve comprises an inner circumferential wall adapted to the outer wall of the connecting shaft and an outer circumferential wall adapted to the inner wall of the driveshaft. The inner and outer circumferential walls are connected via radially extending partitions that are spaced apart from one another. Air chambers are formed between the partitions. If shock-like forces occur, a damping effect is achieved due to the material properties and the material displacement by applying a force in circumferential direction.

In a particularly preferred embodiment, the fixed component consists of at least one of the landing gears, a semi-trailer floor or a structural member of the vehicle, such that the fixed component is rigidly connected with the motor.

This has the advantage, first of all, that a smaller clearance is required because there are no spring elements that elastically support the motor. In particular, the space available between the connecting shaft and the underside of the semi-trailer floor is often tight. Due to the rigid mounting of the motor, incoming lines to the motor do not have to be flexible. A further safety aspect is that there are no moving parts on the outside. In addition, the weight forces of the motor are supported via the fixed mounting and are not transmitted via the connecting shaft to the bearings of the landing gear, which would otherwise be subject to greater wear.

Advantageously, the elastic sleeve is non-rotatably mounted on the connecting shaft and the driveshaft. This can be accomplished, for example, by bonding or vulcanizing.

In one advantageous embodiment, the belt drive has a drive belt which loops around a driving wheel that is non-rotatably mounted on the driveshaft and a driven wheel that is non-rotatably mounted on the connecting shaft.

The drive belt can be made of an elastic material.

As an alternative to an elastic drive belt, a fixed, flexibly mounted tension roller can engage with a drive belt that has little elasticity. In the quasi-stationary operating state, i.e. as the landing gear is telescoped, a pretensioning force is applied to the drive belt via the flexibly mounted tension roller. When the landing gear reaches a limit stop, the tension roller is pushed back by the drive belt and thus dampens the shock-like load.

In a further advantageous embodiment, the slip coupling has a driving gear wheel with internal teeth, which is mounted on the driveshaft and engages with a complementary driven gear wheel with external teeth, which is mounted on the connecting shaft. The driving gear wheel and/or the driven gear wheel are mounted on the driveshaft or the driven shaft in a non-positive fit with a predefined friction coefficient. In case of an abrupt load, at least one of the gear wheels slips on its shaft in circumferential direction and thereby prevents the shock from being transmitted to the motor.

It has proven to be particularly advantageous if the driveshaft is configured as a hollow shaft. This has the advantage that the commonly used connecting shaft can be pushed through the driveshaft configured as a hollow shaft and as a result can continue to be used to a limited extent.

The hollow shaft can have a circular cross section. This, in turn, simplifies the power transmission from the motor to the driveshaft.

The motor is preferably not self-locking, i.e. in case of a power failure or some other malfunctioning of the motor, the landing gear can still be moved by means of a hand crank as before.

The motor preferably is an electric motor. An electric motor is cost-effective, low-maintenance, compact and easy to connect by means of a power cable, independent of a compressed air supply.

The motor is advantageously designed for a torque of 5 to 15 Nm.

BRIEF DESCRIPTION OF THE DRAWINGS

The invention will now be described in greater detail, by way of example, with reference to the drawing figures, in which.

DETAILED DESCRIPTION OF THE INVENTION

Figure 1:
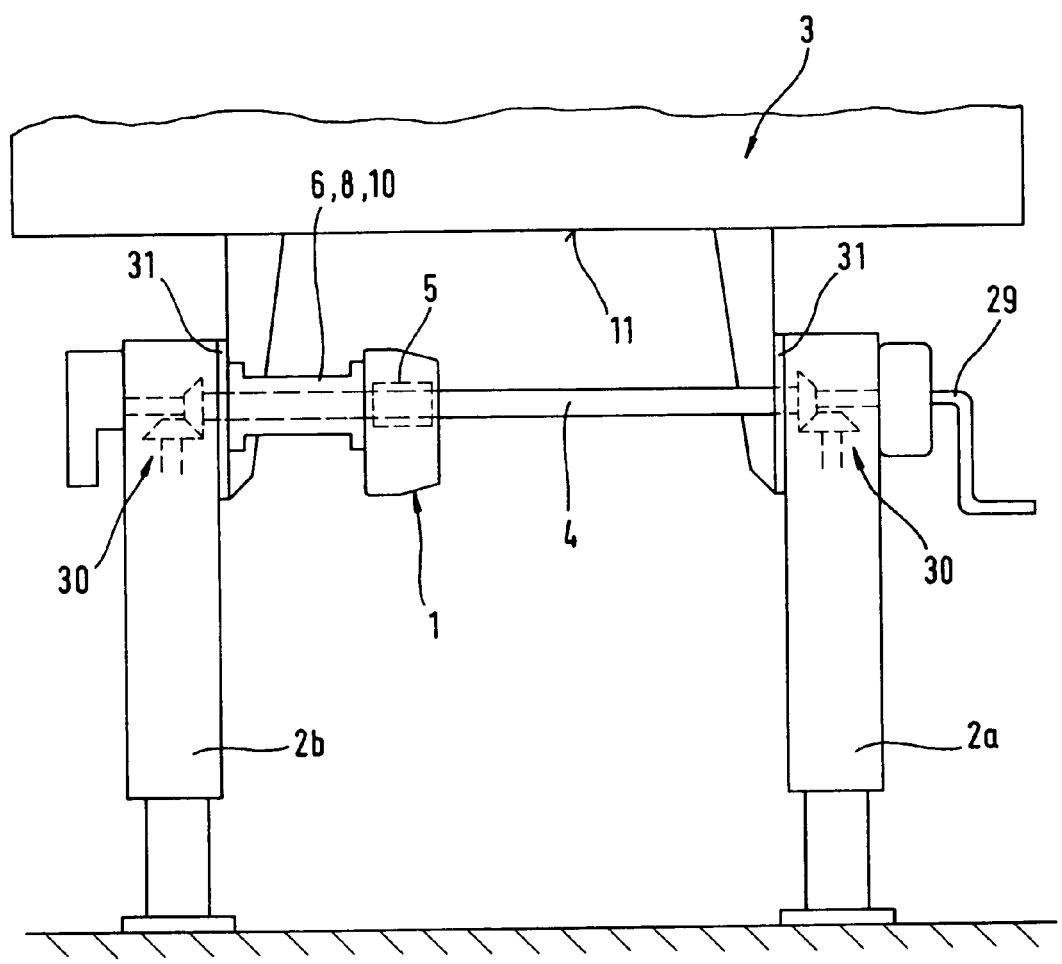
FIG. 1 is a schematic back view of an arrangement of a motor on the connecting shaft with fixed support relative to a landing gear.

FIG. 1 shows twin landing gears 2a, 2b arranged on a semi-trailer 3, which touch the ground when extended. A hand crank 29 may be seen on the landing gear 2a, which can be used to move the landing gears 2a, 2b if the motor 1 fails. The landing gears 2a, 2b are screwed to the semi-trailer 3 via a landing gear mounting plate 31. Each of the landing gears 2a, 2b, is equipped with a landing gear gearbox.

The motor 1 is disposed on the connecting shaft 4 that interconnects the two landing gears 2a, 2b and with its driveshaft 5 non-rotatably encloses the connecting shaft 4. Via a spring element 6, which in the present case is configured as a torsion element 8, the motor 1 is elastically connected with the landing gear 2b and at the same time is secured against co-rotation. The torsion element can also be configured as an elastic hose 10 or an elastic tube.

Figure 2:
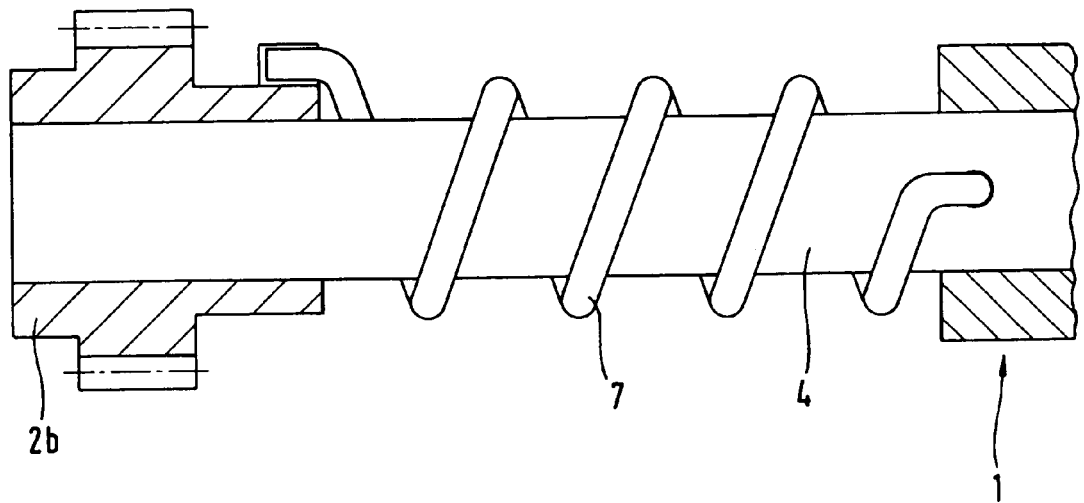
FIG. 2 is a partial view of an elastic support of the motor on a landing gear.

In FIG. 2, the motor 1 is elastically connected with the landing gear 2b by means of a spiral spring 7 instead of a torsion element 8. The connecting shaft 4 runs through the center of the spiral spring 7.

Figure 3:
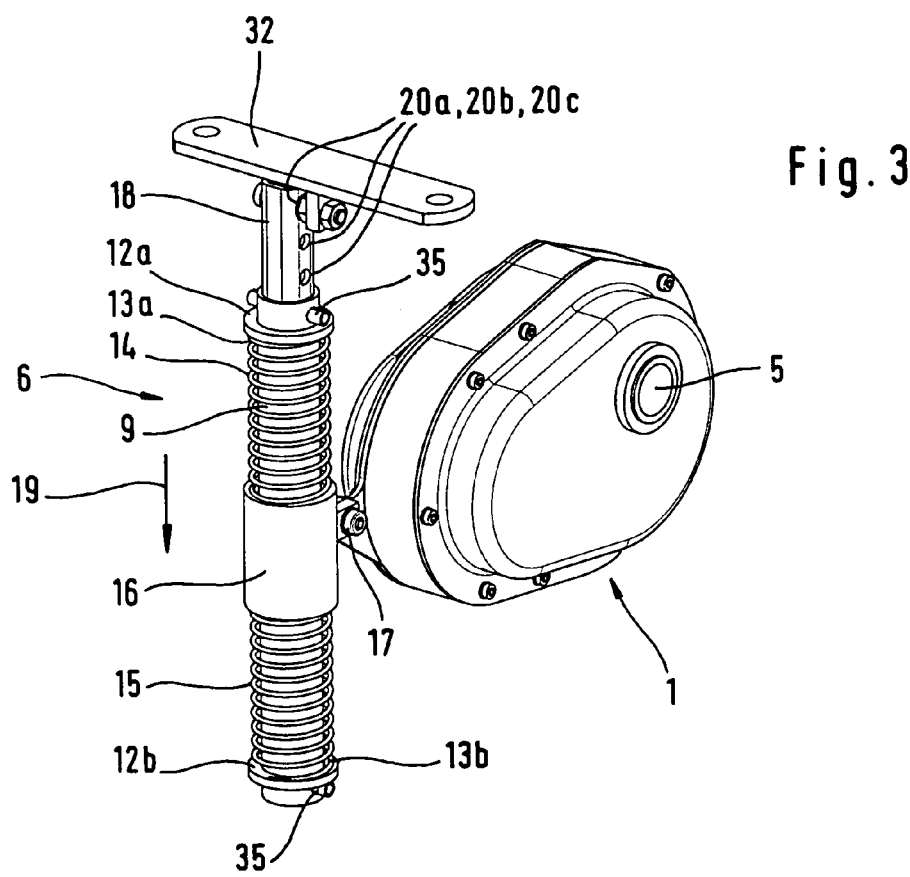
FIG. 3 is a perspective view of an elastic support of the motor on the semi-trailer.

FIG. 3 is a perspective view of an alternative embodiment in which the motor 1 is supported on the underside of a semi-trailer floor 11 (see FIG. 1) by means of a spring element 6.

In a center area of the motor, the rotatable driveshaft 5 protrudes on both sides.

The motor 1 is supported via the stop point 17 and the mounting bushing 16, which in turn is clamped between the upper partial spring 14 and the lower partial spring 15. The partial springs 14, 15 are each placed onto a guide tube 9 and are fixed at their outer ends 13a, 13b by means of end stops 12a, 12b.

To enable the spring element 6 to be mounted on structurally different semi-trailers, the guide tube 9 can be mounted so as to be displaceable in axial direction 19. For this purpose, the adjusting bolts 35 are pulled out, the guide tube 9 and the partial springs 14, 15 as well as the mounting bushing 16 are shifted relative to the inner tube 18, which can be mounted to the underside of the semi-trailer (not depicted) by means of the mounting plate 32, and the adjusting bolts 35 are reinserted in the desired position, e.g. in one of the different visible positions 20a, 20b, 20c. Thus, the position of the motor 1 can be adapted to a predefined position of the connecting shaft 4 without any change in the elastic properties of the spring element 6.

Figure 4:
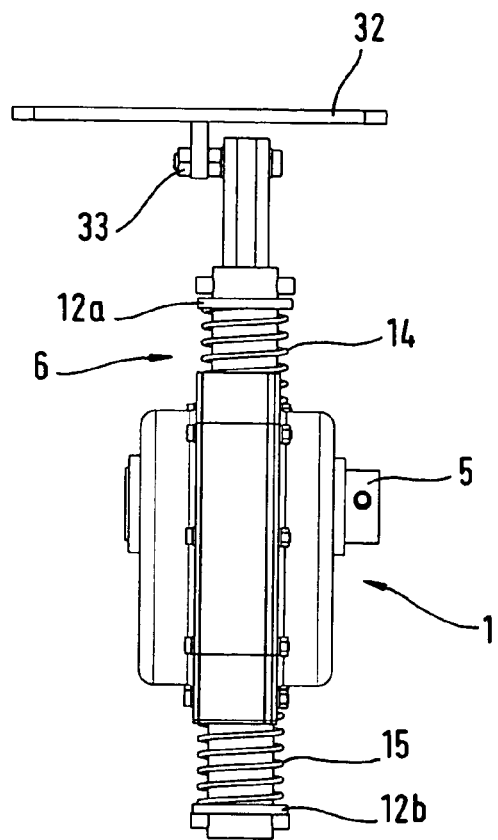
FIG. 4 is a back view of a support according to FIG. 3.

FIG. 4 shows the spring element 6 and the motor 1 in a back view, so that the motor 1 covers the upper and lower partial springs 14, 15. The spring element 6 is connected with the bolting plate 32 by means of a screwed connection 33.

Figure 5:
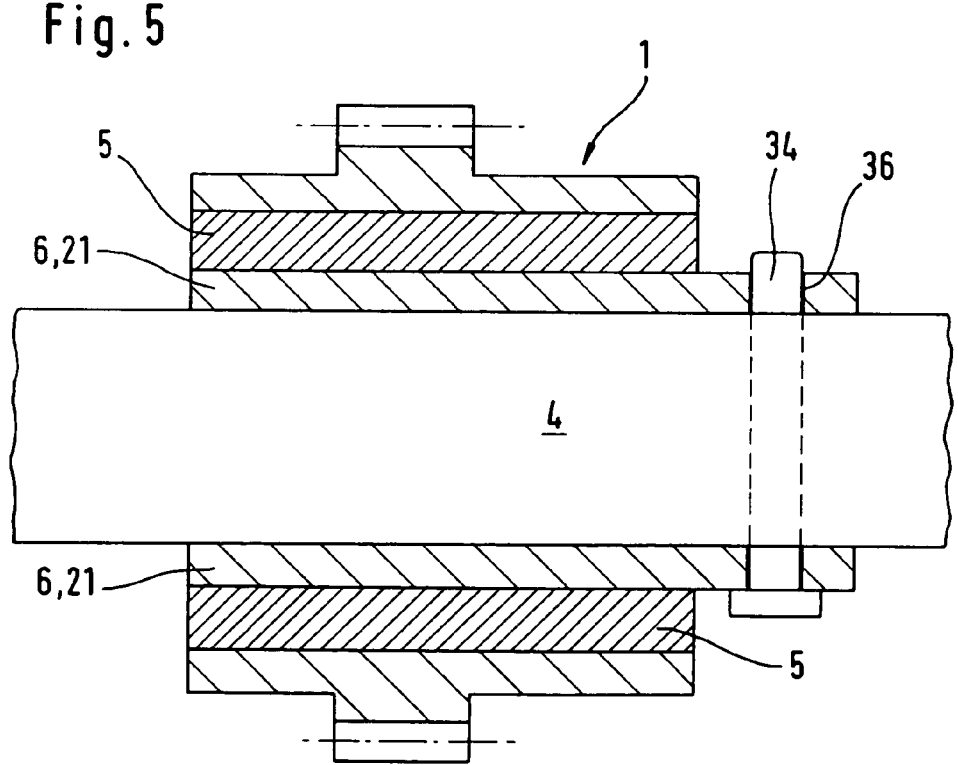
FIG. 5 is a longitudinal section of the motor with driveshaft, elastic sleeve and connecting shaft.

FIG. 5 is a section of a motor 1, wherein a spring element 6 in the form of an elastic sleeve 21 is arranged between the driveshaft 5 and the connecting shaft 4. The elastic sleeve 21 is brought out of the motor 1 on one side and has a bore 36 that extends through the elastic sleeve 21 and the connecting shaft 4, through which a connecting bolt 34 is pushed. By means of the connecting bolt 34, the elastic sleeve 21 and the connecting shaft 4 are interconnected in a positive locking connection and are thus secured against rotation. The driveshaft 5 is also connected with the elastic sleeve 21, e.g. by bonding.

In the embodiment according to FIG. 5, the motor 1 can be rigidly mounted to the underside of the semi-trailer floor 11, since the elasticity required when the landing gear 2a, 2b is driven against a limit stop is provided between the driveshaft 5 and the connecting shaft 4.

Figure 6:
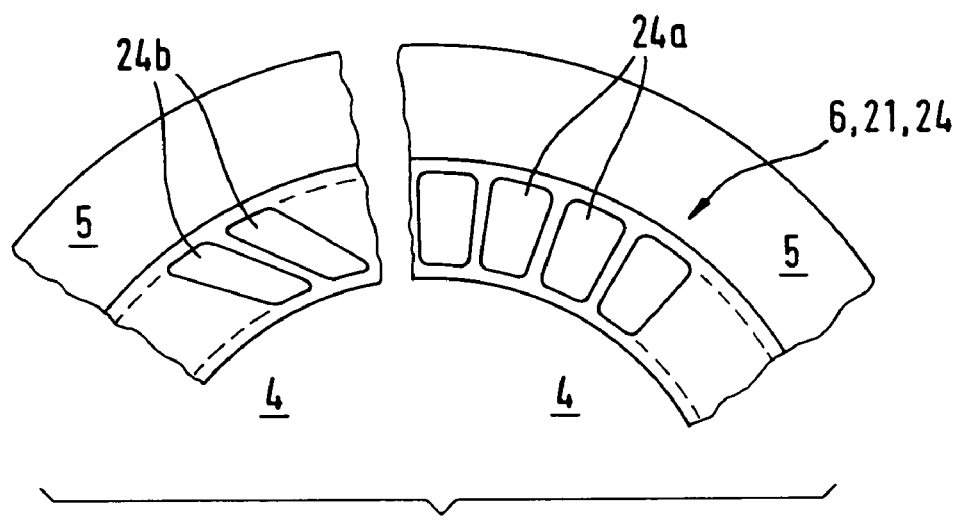
FIG. 6 is a cross section of an air chamber sleeve.

FIG. 6 shows an air chamber sleeve 24 as a special form of the elastic sleeve 21. By way of example, the air chambers 24a are shown in a relaxed state, while the air chambers 24b are depicted under load. The air chamber sleeve 24 is non-rotatably mounted between the driveshaft 5 and the connecting shaft 4.

Figure 7:
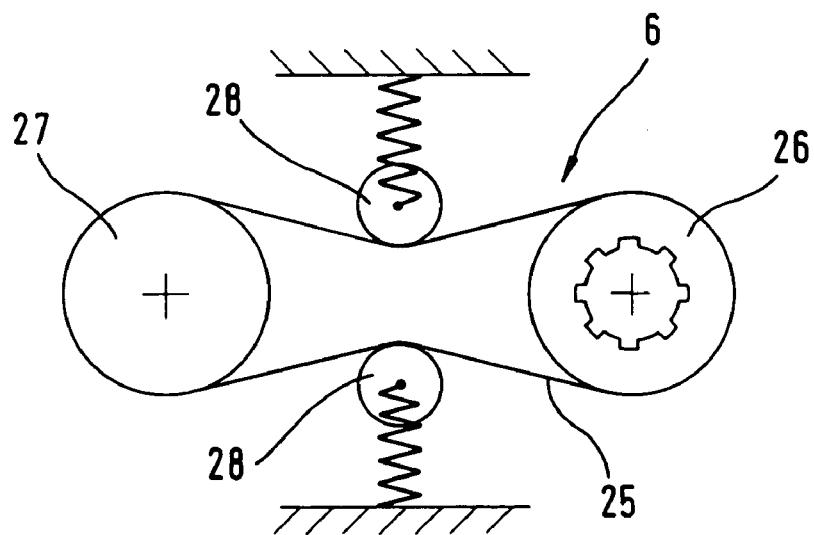
FIG. 7 is a schematic side view of a belt drive.

An alternative spring element 6 is shown in FIG. 7 in the form of a belt drive 22. Here, a driving wheel 26 drives a driven wheel 27 via a drive belt 25. The driving wheel 26 is non-rotatably connected with the driveshaft 5 while the driven wheel 27 is non-rotatably connected with the connecting shaft 4.

Tension rollers 28 engage with the drive belt 24 from the outside on both sides to pretension the belt. As the landing gear 2a, 2b is telescoped against a limit stop, the drive belt 25 presses against one of the tension rollers 28 such that the impact is absorbed.

| List of Reference Numerals | |
|---|---|
| 1 | motor |
| 2a, b | landing gear |
| 3 | semi-trailer |
| 4 | connecting shaft |
| 5 | driveshaft |
| 6 | spring element |
| 7 | spiral spring |
| 8 | torsion element |
| 9 | guide tube |
| 10 | elastic hose |
| 11 | underside of semi-trailer floor |
| 12a, b | limit stop |
| 13a, b | outer end of partial spring |
| 14 | upper partial spring |
| 15 | lower partial spring |
| 16 | mounting bushing |
| 17 | stop point |
| 18 | inner tube |

| -continued | |
|---|---|
| List of Reference Numerals | |
| 19 | axial direction of guide tube |
| 20a, b, c | different positions |
| 21 | elastic sleeve |
| 22 | belt drive |
| 24 | air chamber sleeve |
| 24a | air chamber without torsional load |
| 24b | air chamber with torsional load |
| 25 | drive belt |
| 26 | driving wheel |
| 27 | driven wheel |
| 28 | tension roller |
| 29 | hand crank |
| 30 | landing gear gearbox |
| 31 | landing gear mounting plate |
| 32 | bolting plate |
| 33 | screwed connection to bolting plate |
| 34 | connecting bolts |
| 35 | adjusting bolts |
| 36 | bore |

The invention claimed is:

1. An apparatus, comprising: arrangement of a motor on twin landing gears on a semi-trailer of a tractor-trailer, wherein the landing gears are interconnected via a connecting shaft and can be telescoped by starting up the motor, wherein a driveshaft of the motor directly engages with the connecting shaft and the motor is supported on a component that is fixed relative to the motor, and wherein a spring element is arranged between the motor and the fixed component.

2. An apparatus as claimed in claim 1, wherein the spring element comprises a spiral spring, a torsion element or a shock absorber.

3. An apparatus as claimed in claim 2, wherein the torsion element comprises an elastic hose.

4. An apparatus as claimed in claim 3, wherein the connecting shaft is arranged within the spiral spring or the torsion element without contacting the spiral spring or torsion element.

5. An apparatus as claimed in claim 1, wherein the fixed component is at least one of the two landing gears.

6. An apparatus as claimed in claim 5, wherein a spiral spring or a torsion element is non-rotatably mounted to at least one of the landing gears and to the motor.

7. An apparatus as claimed in claim 5, wherein a spiral spring or a torsion element at least partially surrounds the connecting shaft.

8. An apparatus as claimed in claim 1, wherein the connecting shaft is fixed to and is adapted to co-rotate with the driveshaft.

9. An apparatus as claimed in claim 1, wherein the driveshaft is configured as a hollow shaft.

10. An apparatus as claimed in claim 9, wherein the hollow shaft has a circular cross section.

11. An apparatus as claimed in claim 1, wherein (a) the motor is not self-locking, (b) the motor comprises an electric motor, or (c) the motor is designed for a torque of 5 to 15 Nm, or combinations thereof.

12. An apparatus, comprising: arrangement of a motor on twin landing gears on a semi-trailer of a tractor-trailer, wherein the landing gears are interconnected via a connecting shaft and can be telescoped by starting up the motor, wherein a driveshaft of the motor directly engages with the connecting shaft and the motor is supported on a component that is fixed relative to the motor, wherein a spring element is arranged between the motor and the fixed component, and wherein the motor is located between the landing gears.

13. An apparatus as claimed in claim 12, wherein the spring element comprises a spiral spring, a torsion element or a shock absorber.

14. An apparatus as claimed in claim 13, wherein the torsion element comprises an elastic hose.

15. An apparatus as claimed in claim 14, wherein the connecting shaft is arranged within the spiral spring or the torsion element without contacting the spiral spring or torsion element.

16. An apparatus as claimed in claim 12, wherein the fixed component is at least one of the two landing gears.

17. An apparatus as claimed in claim 16, wherein a spiral spring or a torsion element is non-rotatably mounted to at least one of the landing gears and to the motor or wherein a spiral spring or a torsion element at least partially surrounds the connecting shaft.

18. An apparatus as claimed in claim 12, wherein the connecting shaft is fixed to and is adapted to co-rotate with the driveshaft.

* * * * *